United States Patent
Grieco (12)

(10) Patent No.: US 6,242,027 B1
(45) Date of Patent: Jun. 5, 2001

(54) APPARATUS FOR MANUALLY PORTIONING PIZZA DOUGH DISKS AND METHOD OF OPERATING THE APPARATUS

(76) Inventor: Leonardo Grieco, Via Giulio Cesare 2, 21050 Saltrio (IT)

( * ) Notice: Subject to any disclaimer, the term of this patent is extended or adjusted under 35 U.S.C. 154(b) by 0 days.

(21) Appl. No.: 09/593,679

(22) Filed: Jun. 14, 2000

(30) Foreign Application Priority Data

Jun. 15, 1999 (CH) .................................................. 1116/99

(51) Int. Cl.[7] .............................. A21C 3/00; A21D 6/00
(52) U.S. Cl. .......................... 426/502; 99/353; 99/427; 99/432; 264/163; 425/298; 425/318; 425/355; 426/503; 426/518
(58) Field of Search .................................... 426/502, 503, 426/518; 425/318, 355, 292, 298; 264/163; 99/427, 432, 353

(56) References Cited

U.S. PATENT DOCUMENTS

| 5,074,778 | * | 12/1991 | Betts, Jr. et al. ........................ 99/432 |
| 5,269,674 | | 12/1993 | Skoog et al. .......................... 425/238 |
| 6,067,897 | * | 5/2000 | Grieco .................................... 99/432 |

FOREIGN PATENT DOCUMENTS

| 490805 | 7/1970 | (CH) . |
| 583520 | 1/1977 | (CH) . |
| 604531 | 9/1978 | (CH) . |
| 609212 | 2/1979 | (CH) . |
| 2704432 | 8/1978 | (DE) . |
| 3444085 | 6/1986 | (DE) . |
| 3826934 | 3/1989 | (DE) . |
| 3809730 | 10/1989 | (DE) . |

OTHER PUBLICATIONS

Swiss Patent Application No. 1999 0057/99, filed on Jan. 14, 1999.

* cited by examiner

Primary Examiner—George C. Yeung
(74) Attorney, Agent, or Firm—Greenblum & Bernstein, P.L.C.

(57) ABSTRACT

An apparatus and process for manually portioning pizza dough disks having a calibrated volume and suitable for mechanical final spreading. The apparatus includes a support member fastened to a base plate, a circular lower plate arranged in a substantially horizontal configuration onto which the dough is to be placed, and a circular upper plate arranged in a substantially horizontal configuration coaxial with the circular lower plate and having of a diameter substantially equal to a diameter of the circular lower plate. A device for moving the circular lower and upper plate towards each other to a predetermined final distance which corresponds to a desired thickness of a dough disk is provided, as well as a cutting element having a sleeve with a cutting edge for removal of excessive dough emerging radially from an annular space between the circular lower and upper plates, and a moving mechanism for axially moving the sleeve relative to the circular lower and upper plate. The cutting edge cuts excessive dough emerging radially from the annular space between the circular lower and upper plate. The method includes placing a ball of pizza dough of a volume greater than a desired final volume onto the circular lower plate, moving the circular upper plate and the circular lower plate toward each other until the dough ball is pressed into the annular space between the circular lower plate and upper plate, and moving the sleeve of the cutting element to cut off a ring of excessive dough which emerges radially from the annular space between the two plates.

18 Claims, 5 Drawing Sheets

APPARATUS FOR MANUALLY PORTIONING PIZZA DOUGH DISKS AND METHOD OF OPERATING THE APPARATUS

BACKGROUND OF THE INVENTION

1. Field of the Invention

The present invention concerns an apparatus for manually portioning pizza dough disks of measured volume and suitable for mechanical final spreading of the pizza dough, in particular under the influence of the centrifugal force, in which the dough, previously subdivided into portions of a volume greater than the one of the calibrated dough disk, is pressed between two flat surfaces of circular shape.

The present invention also concerns a method of operating the portioning apparatus.

2. Discussion of Background Information

In the trade of manually manufacturing pizzas where the dough discs are prepared one by one by an operator more or less trained for this task this operation inevitably involves the forming of a ball of prepared dough of predetermined weight (of about 200 g) which ball then is spread out to form a thin disk of dough of the desired volume. If the formation of the dough disk is effected entirely manually, preferably by an experienced pizzaiolo who spreads the dough into its final shape by swirling it in the air overhead, the forming of the initial dough ball presents no particular problems concerning the consistency of its weight (or of its volume which in a homogeneous and well raised dough perfectly correlates with its weight). In this case the pizzaiolo as a rule can rely on his expert ability using which he is able to subdivide the dough into balls (or blocks) of fairly constant weight ranging within acceptable tolerances as well as to correct any small errors in his weight judgement during the subsequent step of spreading the dough. If the pizzaiolo notices he formed a ball of excessive weight he just "spreads" the dough applying a little less energy (and centrifugal force in the last operation connected to the swirling of the dough disk in the air) for obtaining the desired disk diameter all the same. The only difference compared to the ideal spreading of the dough is that the disk of dough is somewhat thicker which the expert pizzaiolo easily can take into account during the baking process. The opposite deviation, if a dough ball turns out to be too light, is corrected by spreading it more intensely for obtaining a dough disk the same diameter desired, which just is a bit thinner. All this requires the work of an expert pizzaiolo who performs all operations manually himself and thus is in a position to take corrective action against any deviations throughout the production process.

In recent times, a consistent evolution is noticed in the craft of pizza preparation which is speeded up considerably since the introduction of mechanical systems which spread the dough disk using devices applying—exactly as the traditional pizzaiolo does—centrifugal force. These machines are able to spread the dough, starting from a dough disk of about 18 cm, to its final diameter of the pizza disk of about 35 or 40 cm as desired very fast and reliably. Their advantage is seen in the speed of the operation (a plurality of dough disks is spread out in just a few seconds) and mainly in that the specific manual dexterity of a professional pizzaiolo can be dispensed with. Any person, even without particular training thus is capable of spreading a perfect pizza disk of constant diameter and consistent properties, which constitutes a considerable advantage for small and medium pizzeria operations which not always can afford to hire an experienced pizzaiolo. Such pizza spreader machines, especially if a plurality of dough disks is processed simultaneously (i.e. if more than one dough disk is spread out in one go), for correct operation and for producing pizza disks all of the same diameter, must be supplied, however, with dough disks (seen as an intermediate product in the production process) of calibrated weight ranging within quite stringent tolerance limits. The pizza spreader machine itself is not able to distinguish too heavy dough disks from too light ones, and especially if a plurality of disks are to be spread in the same operation, the same centrifugal force is applied to all of them in such a manner that different pizza disk diameters would result. This obviously is not a sound base of a pizzeria operation.

According to the state of the art dough portioning devices are already known, in particular for manufacturing bread or similar products, but they mostly concern actual machines not operated manually and laid out for producing great daily quantities of bread loafs or rolls, etc. Such machines, the main objective of which is to accelerate the production of bread dough balls without subjecting the dough to excessive mechanical or thermal strain—strain that would impair the quality of the final product—in many cases function according to the principle of a cylinder into which the dough is sucked in and from which it then is expulsed using a piston. Such machines require a source of suction vacuum for sucking in the dough. Such machines, the disadvantage of which for small and medium pizzeria operations is seen in the necessity of installing a suction plant for sucking in the dough, which results in an installation which is too complex and cost-intensive, are known e.g., from the CH-583520, CH-490805, CH-604531 and CH-609212 as well as from the U.S. Pat. No 5,269,674.

Other types also known of dough subdividing or portioning devices are not adapted to craft trade pizzerias at which type operation the present invention is aimed at in particular: thus the DE-3826934 which shows a dough subdividing device functioning with two measuring chambers arranged on a metering cylinder and equipped with pistons ejecting the portion of dough, or the DE-3444085 in which a system is shown for portioning the dough, working with a pair of rolls provided with chambers which are open in the radial direction, and the points of which meet in a common plane, and which thus subdivide the dough into portions, an arrangement which shows solutions of mechanical problems which are quite complex and suitable for manufacturing great quantities of units per hour, which are usual in today's industrial bread plants.

Manually operated presses also are known for producing portions of dough or of similarly soft foodstuff masses, such as e.g. from the DE-2704432 or DE-3809730. In the first mentioned case merely a mechanism is concerned for moving a piston over constant increments in a dough-filled cylinder in such a manner that with each actuation an identical quantity of dough is squeezed out of openings provided at the bottom end of the cylinder: the cylinder thus represents a container from which, just as from a tooth paste tube, a given product quantity is expelled during each actuation of the manually operated lever. The second case represents the old potato press, i.e. a cylinder with openings provided in its bottom via which the hand-operated piston presses a certain quantity of potato mass—so-called "Spätzle"—and the invention merely proposes that the detachable actuating pin of the lever be secured against being lost. Both of these arrangements, in fact just represent manually operated dough presses and can not furnish any teachings concerning the objective of the present invention, which the production of dough disks for pizzas of calibrated volume, and thus of calibrated weight, according to the requirements described above.

Proposed by the applicant of the present invention furthermore a manually operated portioning device for forming balls of pizza dough is known applied for on Jan. 14, 1999 under the Swiss Patent Application number 1999 0057/99.

This application concerns a portioning apparatus suited to produce balls of pizza dough or dough portions of approximately spherical shape and suitable for forming pizza disks using machines which mechanically spread the dough under the influence of centrifugal forces, which corresponds to the objective of the present invention also. According to this proposal the dough is pressed into a cup-shaped container formed by a combination of a cylinder and a piston defining a chamber which in its final position corresponds to the calibrated volume of the dough ball. For obtaining the desired calibration of the volume of the dough ball said chamber is provided with at least one opening via which the excessive quantity of dough can be squeezed out and can be separated from the dough mass remaining inside the chamber.

This manually operated portioning apparatus, however, still shows two disadvantages which can not be neglected, namely:

a) dough balls are produced instead of dough disks. Such balls, if they are to be spread out correctly in the pizza spreader machine under the influence of centrifugal force, thus must be flattened by hand in such a manner that a dough disk of considerable thickness (of about 10 mm or more) is formed which can be considered as an intermediate product in the pizza production process according to the present invention, and b) The operation of squeezing the excess dough quantity via one or more openings provided in the chamber has proven to require application of considerable physical effort as the dough due to its very tough consistency resists against being squeezed out of one or more openings of a closed chamber. The forces to be applied thus prove excessive and require a very robust construction of the portioning device requiring also considerable space if sufficient multiplication of the forces is to be ensured (length of the lever arm).

SUMMARY OF THE INVENTION

Thus it is an objective of the present invention to propose a manually operated portioning apparatus, which is of simple construction and easy to operate, for producing dough disks for pizzas of calibrated and constant weight, also in small and medium pizzeria operations applying the rules of the traditional kitchen, and which therefore have equipped themselves with a pizza spreader machine applying centrifugal force.

Further, it thus is an objective of the present invention to solve the problem of the manual preparation of the dough for producing pizza disks using the system in which centrifugal force is applied, and to overcome the disadvantages mentioned of the former state of the art. In particular the manually operated portioning apparatus aims at:

a) permitting the production of dough disks of calibrated volume instead of dough balls. The dough disks are better suited as an intermediate product than the dough balls described as they obviously can be spread out into pizza disks of the desired final diameter using the centrifugal force without requiring any additional operations compared to the dough balls which before being spread out under the influence of centrifugal force must be flattened by hand in such a manner that they form a disk.

b) reducing the muscle power to be applied for operation of the machine and thus at reducing also the dimensions required of the machine, and finally also the cost of producing the machine.

These objectives are realized using a manually operated portioning apparatus that includes a support member in the form of a yoke fastened to a base plate, a circular lower plate arranged horizontally onto which the dough portion previously subdivided manually is placed, a circular upper plate arranged horizontally of a diameter equal to the one of the lower plate and arranged coaxially with the lower plate, a device for approaching the two plates towards each other to their closest distance from each other which determines the desired thickness of the dough disk, and a cuffing element for the excessive dough emerging radially from the between the rims of the two plates in their final position described above. The cuffing element includes a sleeve surrounding one of the plates provided with a cutting edge and arranged outside of the interspace between the two plates during the entire phase of approach. A mechanism for axially moving the sleeve of the cutting element relative to the two plates is provided to be lifted to interfere with the annular space between the two plates and thus to cut the ring of excessive dough emerging radially from the interspace between the two plates.

The concept on which the present invention is based includes substituting the pressing out of excessive dough via openings provided in an enclosed chamber, on which principle the state of the art according to the above mentioned Swiss Patent Application No. 1999 0057/99, against the principle of cutting off the excessive dough which laterally emerges freely from between two pressing plates, using a cutting knife. Cutting off of a ring of dough requires much less force compared to the squeezing out the same quantity of dough via openings. Furthermore according to the present invention the dough no longer is pressed into an essentially enclosed chamber which presents merely one or a plurality of openings via which the excessive quantity of dough can be squeezed out, but is compressed between horizontal plates which are laterally open along their entire circumference, in which arrangement much less effort is to be applied. And owing to this new concept of compression of the dough in a chamber which essentially is open laterally and of freely cutting the excessive quantity of dough the objectives of the present invention are realized.

According to an aspect of the present invention an apparatus for manually portioning pizza dough disks having a calibrated volume and suitable for mechanical final spreading. The apparatus includes a support member fastened to a base plate, a circular lower plate arranged in a substantially horizontal configuration onto which the dough is to be placed, and a circular upper plate arranged in a substantially horizontal configuration coaxial with the circular lower plate and having of a diameter substantially equal to a diameter of said circular lower plate. A device for moving the circular lower and upper plate towards each other to a predetermined final distance which corresponds to a desired thickness of a dough disk is provided, as well as a cutting element having a sleeve with a cutting edge arranged for removal of excessive dough emerging radially from an annular space between the circular lower and upper plates, and a moving mechanism for axially moving the sleeve relative to said circular lower and upper plate. The cutting edge cuts excessive dough emerging radially from the annular space between said circular lower and upper plate.

According to another aspect of the present invention, the circular lower plate is in a fixed position, and circular upper plate is relative to the circular lower plate, from an initial open upper position to a lowest position in which the apparatus is closed and wherein the distance between the circular lower and upper plate corresponds to the predetermined final distance.

Further aspects of the invention include that the circular upper plate is fastened to a guide pin arranged coaxially with the upper circular plate and in which the guide pin slides in a vertical bearing attached to an upper arm of the support member.

According to a still further aspect of the present invention a spring is concentrically located on the guide pin which forces the circular upper plate upward against a vertical stop.

In another aspect of the present invention, the sleeve is arranged below the circular lower plate and can be moved in the axial direction upwardly in such a manner that it moves from a rest position in which its cutting edge is located one of in a plane below and at the same level as an upper surface of said lower plate to a cutting position in which the cutting edge is located above a lower surface of said circular upper plate in its lowermost position which determines the predetermined final distance.

According to a still further aspect of the present invention, the vertical movement of the circular upper plate and of the cutting element is effected using an operating lever for each, the operating lever having a handle that pivots at a pivoting point in such a manner that a manual force applied to the handle of said operating lever is increased by a gained leverage.

Further aspects of the invention include that the pivoting points of the operating levers are configured as open slots in such a manner that the operating levers can be mounted and dismantled without the use of tools, thereby facilitating, the transportation and shipping of the apparatus.

According to other aspects of the present invention the pivoting point of the operating lever for moving the circular upper plate is fastened to a holder which is adjustably fastened in a vertical direction to a vertical portion of the support member, so as to facilitate setting the predetermined final distance between the circular lower and upper plate.

According to another aspect of the present invention, the moving mechanism includes a spring which forces the sleeve against a vertical stop which holds the sleeve outside of the annular space between the circular lower and upper plate in all their respective range of vertical positions.

According to still a further aspect of the invention the diameter of the circular lower and upper plate ranges between 100 and 200 mm. According to another aspect of the present invention, the predetermined final distance between said circular lower and upper plate ranges between 8 and 20 mm.

Additionally, other aspects of the present invention include wherein at least the circular lower and upper plate and the sleeve are made from stainless steel approved for handling food products. In another aspect of the present invention, the support member is in the shape of a yoke.

In another aspect of the invention the sleeve of the cutting element surrounds one of the circular lower and upper plates and is arranged so that the other of said circular lower and upper plates fits within an annular region formed by the sleeve.

According to a still further aspect of the present invention, a method is provided for operating an apparatus for manually portioning pizza dough disks having a calibrated volume and suitable for mechanical final spreading in which the dough is pressed between two flat circular-shaped surfaces. The apparatus includes a support member fastened to a base plate, a circular lower plate arranged in a substantially horizontal configuration onto which the dough portion is placed, a circular upper plate arranged in a substantially horizontal configuration and coaxial with the circular lower plate, and having of a diameter substantially equal to a diameter the circular lower plate, a device for moving the circular lower and upper plate towards each other to a predetermined final distance which corresponds to a desired thickness of the dough disk, a cutting element having a sleeve with a cutting edge for removal of excessive dough emerging radially from an annular space between the circular lower and upper plates, and a moving mechanism for axially moving the sleeve relative to the circular lower and upper plates to cut excessive dough emerging radially from the annular space between the circular lower and upper plate. The method includes placing a ball of pizza dough of a volume greater than a desired final volume onto the circular lower plate, moving, via the moving device, the circular upper plate and the circular lower plate toward each other until the dough ball is completely pressed into the annular space between the circular lower plate and upper plate, and moving, via the moving mechanism, the sleeve of the cutting element to cut off a ring of excessive dough which emerges radially from the annular space between the two plates.

Further aspects of the invention include lowering the sleeve of the cutting element until it rests against a lower stop, lifting the upper plate, taking off the finished dough disk and eliminating the ring of excessive dough.

According to other aspects of the present invention, the process includes moving the sleeve of the cutting element to a lowest rest position and, after the cutting element has been lowered, further lowering the upper plate until it rests against a stop which position determines the predetermined final distance; and lifting the sleeve of the cutting element to an uppermost position in such a manner that it cuts off the ring of excessive dough which emerges radially from the annular space between the two plates.

According to other aspects of the present invention the mechanical final spreading is provided by centrifugal force.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

Figure 1:
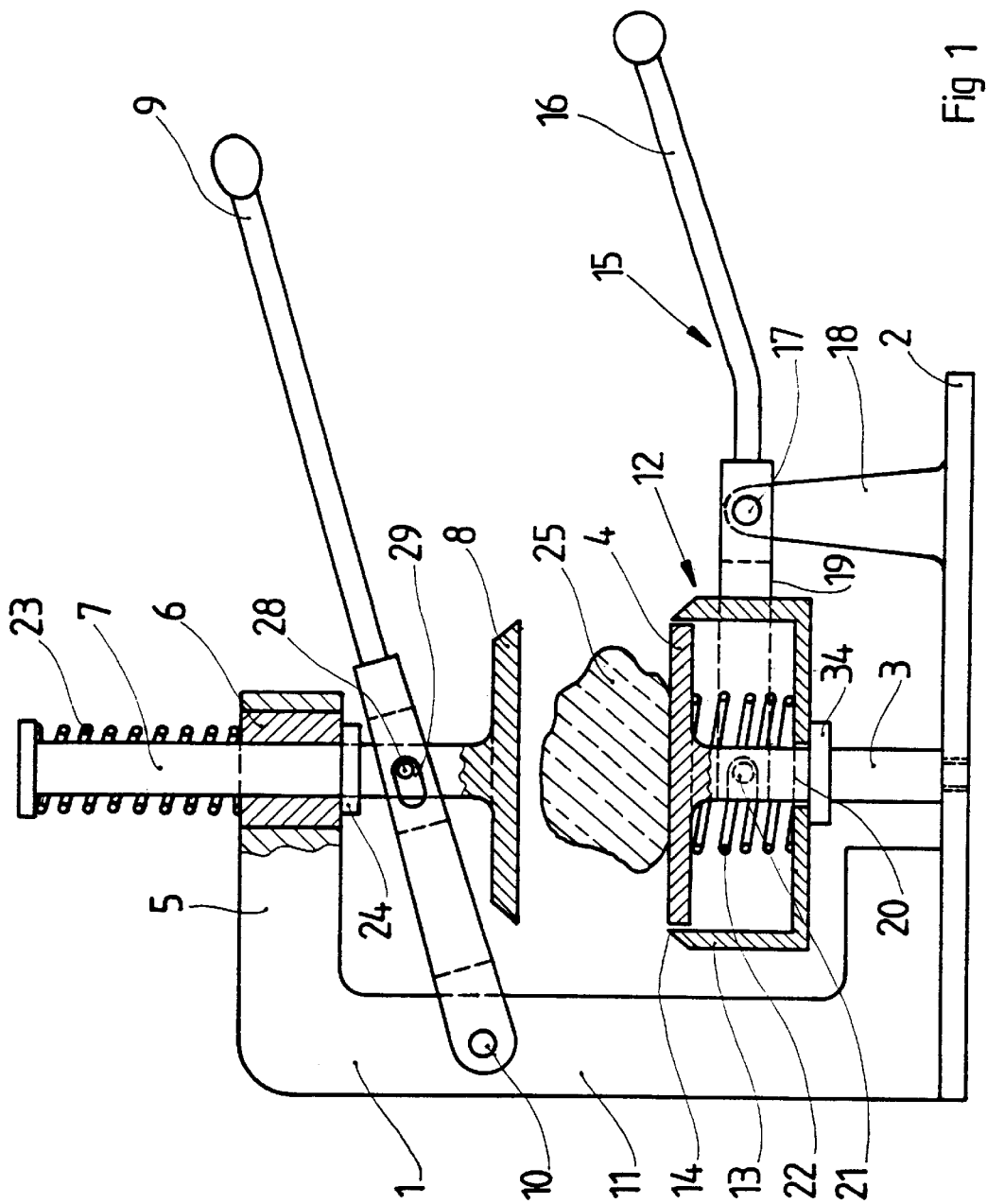
FIG. 1 an overall view of the inventive portioning apparatus, partially shown in section, in a first phase of operation.

The particulars shown herein are by way of example and for purposes of illustrative discussion of the embodiments of the present invention only and are presented in the cause of providing what is believed to be the most usefull and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the FIGS. 1 through 4 a first variant of the inventive manually operated portioning apparatus is shown in four operating positions representing the four main operating phases of the process of transforming a ball of pizza dough of non-measured volume (or weight) into a circular disk of calibrated volume suitable for further spreading under the influence of centrifugal force. The illustrations according to the FIGS. 1 through 4 show partial sections in order to facilitate understanding.

In said Figures a support member in yoke form is designated 1 and is fixed to a base plate 2.

To the base plate 2 a support pin 3 is fastened which on its upper end supports a horizontally arranged circular lower plate 4. The plate 4 in this design example thus is arranged fixed with respect to the surrounding room as it forms a unit with the base plate 2 and the support member 1. In an alternative design example (not shown) of the inventive apparatus the circular horizontally arranged lower plate 4 also can be laid out movable in vertical direction, or the apparatus can be conceived in various lay-outs, all analog in function, for effecting the same task, as will be described more clearly in the discussion of the principle of the function of the apparatus.

In the horizontal arm 5 of the support yoke 1 a slide bearing 6 is provided in which a plunger pin 7 runs, to the lower end of which a circular upper plate 8 is attached extending horizontally, the diameter of which is the same as the one of the lower plate 4, and which is arranged coaxially with the latter.

The upper plate 8 can be approached to, and moved away from, the lower plate 4, coaxially with the latter, as the supporting pin 7 slides in the bearing 6: for this purpose a device is provided which in the specific case illustrated is represented by the operating lever 9 pivoting on the pin 10 in the arm 11 of the support member 1 using which the upper plate 8 can be moved up and down until it approaches the lower plate 4 leaving a final distance h (compare the FIGS. 3 and 4) which is predetermined and which determines, as will be seen later on, the desired thickness of the dough disk.

On the pin 3 supporting the lower plate 4 a cutting element 12 is inserted for cutting off the excess quantity of dough, including a sleeve 13 surrounding the plate 4—but nothing would impede an "inverse" lay-out of the machine in an arrangement in which the sleeve 13 would surround the upper plate 8 instead of the lower plate 4, in which arrangement the position of the sleeve 13, or of the cutting element respectively, is not determined once and for all within the scope of the present invention. The sleeve 13 is provided with a cutting edge 14. The sleeve 13 furthermore is arranged outside the space—of annular shape—between the two plates 4 and 8 during the entire phase of the approach of the plates, shown in the FIGS. 1 through 3, which will be explained in more detail in the discussion of the operation mode of the apparatus.

The cutting element 12, and the sleeve 13 respectively, are provided with a device for axially moving the sleeve 13 with respect to the plate 4, or the plate 8 respectively. Owing to this movement the sleeve 13 will interfere in a final phase of the preparation of the dough disk, which will be explained more clearly in the more detailed discussion of the function and which also is illustrated in the FIG. 4 with the annular space between the two plates 4 and 8. In this arrangement the cutting edge of the sleeve 13 will cut, during is vertical movement (upward in the solution shown in the FIGS. 1 through 4), the ring of excessive dough emerging radially from the interspace between the two plates 4 and 8.

In the design example of the present invention represented in the FIGS. 1 through 4 the device for axially moving the cuffing sleeve 13 includes a lever 16 pivoting on a pivoting pin 17 arranged horizontally and fastened to a support member 18 rigidly connected to the base plate 2.

The other end of the lever 16 forms a fork 19 surrounding the sleeve 13 on both sides over 90° of its circumference each: on each arm of the fork 19 a small fork type slot 20 is provided which engages a pin 21 which in turn is fixed on the wall of the sleeve 13 more or less at its mid-height.

As the lever 16 is pivoted downward (as shown e.g. in the FIGS. 2 and 4) the sleeve 13 is lifted, the force of a force accumulator element being overcome (in the specific case described a helical spring).

From the FIG. 1 another force accumulating element 23 also can be seen, in the specific case described also in the form of a helical spring, which acts on the upper plate 8 pushing it upward against a vertical stop 24.

The spring 23 as well as the spring 22 represent preferred embodiments of the present invention as both of them facilitate manipulation of the machine but are not indispensable for the functionality. The spring 22 and 23, or the force accumulating elements respectively, automatically hold the upper plate 8 lifted and the sleeve 13 lowered, in such a manner that the maximum space between the two plates 4 and 8 is maintained unobstructed for the manual introduction of a dough ball 25 (compare the FIG. 1). The only condition the dough ball in practical operation is required to fulfill demands that its volume exceed, at least be a predetermined percentage, the desired volume of the finished dough disk (compare the FIG. 4) to be produced. Otherwise the shape of the dough ball 2 is irrelevant within the scope of the present invention as will be discussed in more detail in the following the only purpose being that the dough ball 25 be given a precise and constant shape.

The embodiment of the present invention according to the FIGS. 1 through 4 is not representing the only possibility of obtaining the advantages of the inventive portioning apparatus but it shows a preferred solution uniting a plurality of part solutions each of which constitutes an advantageous embodiment of a detail of the portioning apparatus. Evidently it is sufficient, within the scope of the invention, to ensure that the two plates 4 and 8 can be moved towards each other until a predetermined distance between them is reached which corresponds to the desired thickness h of the dough disk 26 (FIGS. 3 and 4), and for achieving this, one of the plates 4 or 8 can be fixed relative to the surrounding room and the other one 8 or 4 can be rendered movable in the direction towards the fixed plate, or both plates 4 and 8 can be moved towards each other simultaneously until the desired distance h between them is reached. Also the position of the sleeve 13 which constitutes the cutting element 12 for the excessive dough can be laid out in such a manner that in its position of rest on the lower side it surrounds the lower plate 4, or on the upper side surrounding the upper plate S. In the first case the sleeve 13 will be moved upward from below as shown in the FIGS. 1 through 4 to be lifted in such a manner that it interferes with the annular space between the two plates 4 and 8, and that it thus cuts off the ring of excessive dough 27 (compare the FIG. 4). In the second case (not shown) the sleeve would be moved downward from above for cutting off the ring of excessive dough. Also in this case the machine would realize all the inventive characteristics of the present invention. Practical application, however, has shown that the embodiment shown in the FIGS. 1 through 4 is particularly advantageous as far as the manipulations to be effected are concerned, especially as in the arrangement described a lower plate 4 is provided fixed relative to the surrounding room in such a manner that the dough ball 25 can easily be placed onto said plate. In this case the upper plate 8 moves in vertical direction from a lifted position, the portioning apparatus being open, to a lowered position, the portioning apparatus being closed. In this latter position (shown in the FIGS. 2 and 4) the distance between the plates 4 and 8 is equal to the desired thickness h of the finished dough disk 26.

According to another preferred embodiment of the present invention the upper plate 8 for easier up and down movements is attached to a guide pin 7 arranged coaxially with said plate 8 and sliding in a vertically arranged bearing 6 fixed to the upper arm of the supporting yoke 5 of the support member 1. The lever 7 thus pulls the supporting pin 7 along its vertical path using a pin 28 and a slot 29 which permit transformation of the pivoting movement of the lever 9 into a linear movement of the supporting pin 7.

According to a further preferred embodiment of the present invention the sleeve 13 which forms the cutting element 12 and is arranged below the lower circular plate 4 and can be moved upward from below in such a manner that it changes from a rest position into a cutting position. In its cutting position the cutting edge 14 of the sleeve 13 must, for reasons to be explained further in the discussion of the function of the portioning apparatus as shown in the FIG. 2, reach a distinctly higher position than the position of the surface of the upper plate 8 in its lowest position in which the predetermined distance h prevails between the plates.

According to a further alternative embodiment of the present invention the vertical movements of the movable plate, e.g., the upper plate 8 of the design the example shown in the FIGS. 1 through 4 and of the sleeve 13 of the same design example are effected using a lever 9, and 16 respectively, for each of the movable elements. These levers 9, 16 are arranged pivoting in a lever pivot point 10, and 17 respectively, in such a manner that the manual forces applied by operating the handle of each of the levers 9, 16 can be multiplied.

This arrangement helps to reduce the manual force required to compress the dough ball and to cut off the rim of excessive dough as will be described in the following. These operations require, due to the substantial toughness of the dough, application of considerable force, in particular for the compression of the dough ball 25. The use of the levers facilitates the operation considerably while the movements required of the levers; 9, 16 remain within the limits of the limited space accorded to the machine.

Figure 4:
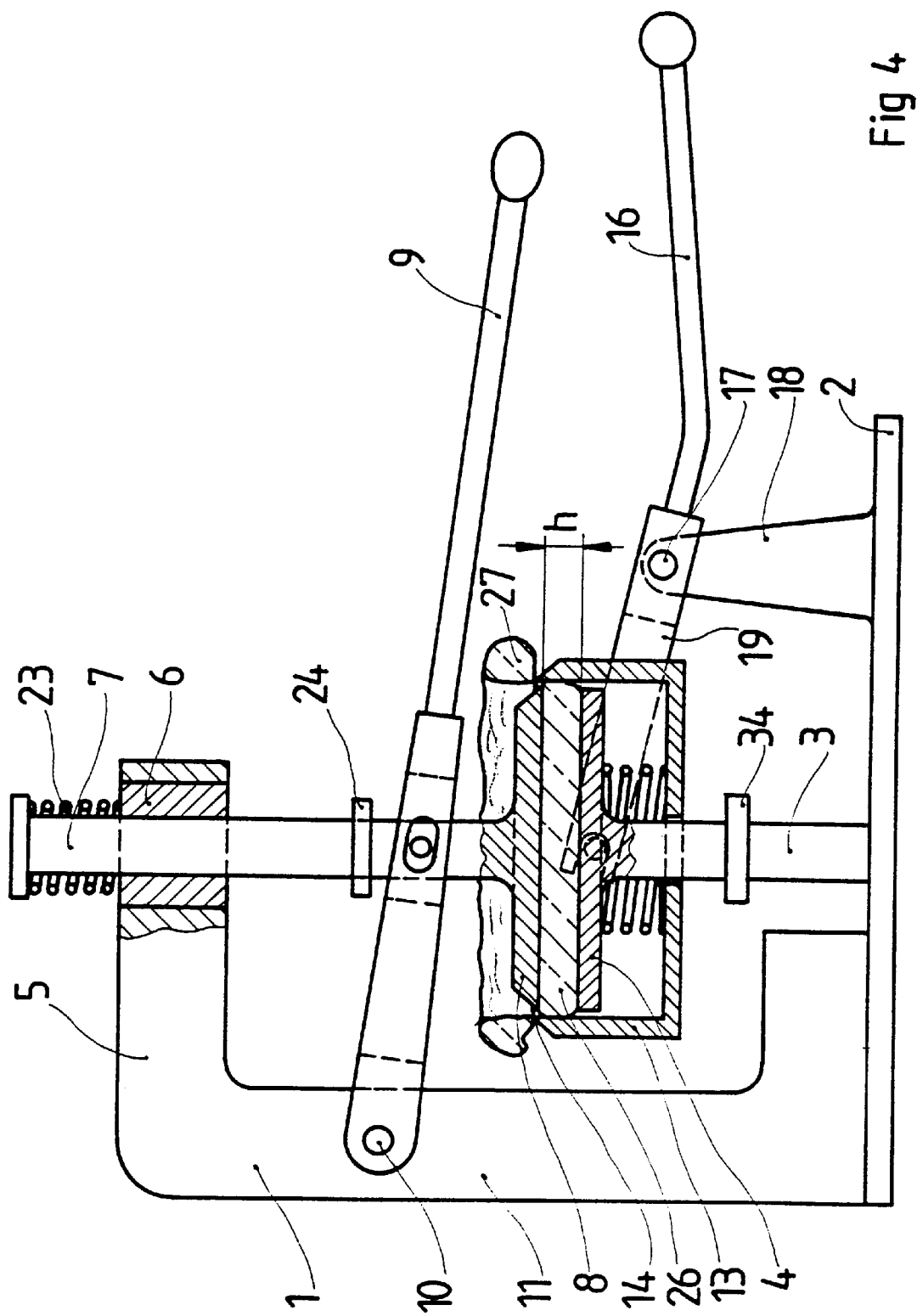
Figure 5:
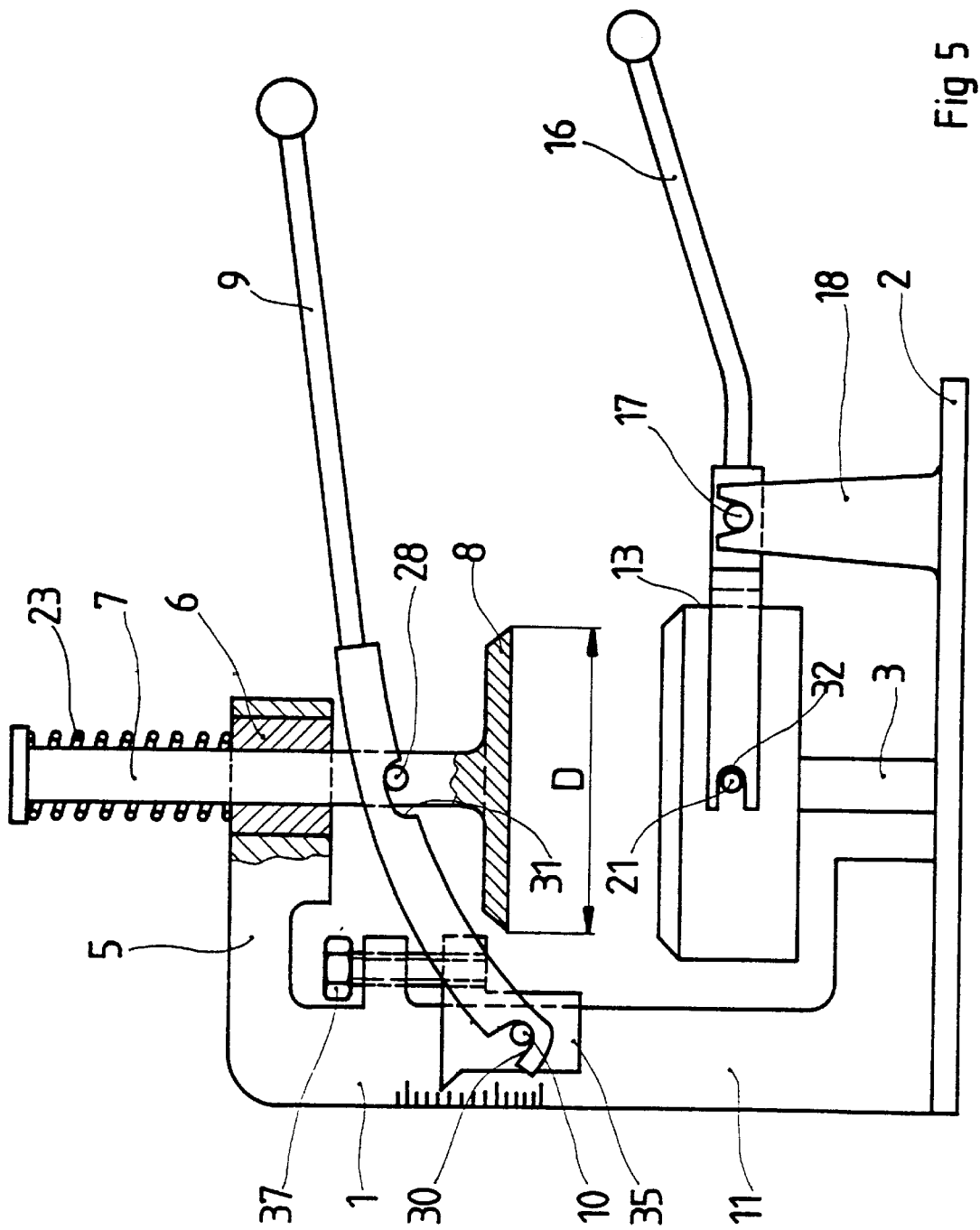
FIG. 5 an alternative variant of the portioning apparatus showing several design details which facilitate the manipulations for operating the apparatus.

In the FIG. 5 a variant embodiment of the present invention is shown the purpose of which is to facilitate handling the transport of the portioning apparatus. For this purpose, in an apparatus in which the same main elements used as in the one shown in the FIGS. 1 through 4 are designated by the same reference numbers, the levers 9 and 16 are laid out in such a manner that they can be dismantled rapidly without the help of tools. In the FIG. 5 it is shown in which manner, for obtaining this result, the lever 9 moving the upper plate 8 "engages" its pivoting point 10 in a slot which is open towards the upper side. The lever 9 presses the pin 28 fastened to the supporting pin 7 of the plate 8 via a further slot 31 open towards the lower side. This slot is of elongated form and can form the stops for the uppermost position (shown in the FIG. 5), as well as for the lowest position of the upper plate 8. The lever 9 thus easily is removed from its mounted position if e.g., first it is taken out of engagement with the pin 28 by pressing the supporting guide pin 7 downward and by then taking the lever off from its pivoting pin 10.

In similar manner the lever 16 for the cutting sleeve 13 is provided with two open slots 32 engaging the corresponding pins 21 attached to the sleeve 13 (one of which only is visible in the FIG. 5) and with a pivoting pin 17 engaging a slot 33 in the support element 18 which is open towards the upper side. Also in this arrangement the lever 16 can be easily taken off from its working position without using any special tools. Obviously the movements of the working elements (the plate 8 or 4, the cutting sleeve 13) are to be limited by suitable stops (e.g., the stop 24, already described, for the uppermost position of the upper plate 8 or the stop 34 (FIGS. 1 through 4) for determining the lowest position of the cutting sleeve 13). Of particular importance in this concept is the possibility that the thickness of the dough disk 26 (FIG. 4) can be easily adjusted to the desired value.

In the FIG. 5 a preferred solution to this problem is illustrated which includes the arrangement of the pivoting point 10 of the lever 9, which moves the upper plate 8, is fastened to a holder 35 which in turn is mounted vertically adjustable on the support member 11 of the supporting yoke 1. As the holder 35, and thus the pivoting pin 10 with it, is shifted up or down to the positions indicated on a graded scale 36 (which e.g., can indicate the thickness of the dough disk in mm or its weight in grams), the lowest point of the movement of the upper plate 8, as the lever 9 reaches its stop against the left hand side end of the slot 31, is moved automatically. The height position of the holder 35 can be set using the adjusting screw 37. The solution described here merely represents one of a great variety of similar solutions all of which are aimed at facilitating easy control of the thickness h of the finished dough disk 26.

According to another preferred embodiment of the present invention the diameter D (FIG. 5) of the plates 4, 8 ranges between 100 and 200 mm whereas the closest distance h between the plates 4 and 8 ranges from 8 to 20 mm. These dimensions have proven adequate for producing pizzas using the subsequent spreading of the dough disk under the influence of the centrifugal force to a diameter ranging between 30 and 50 cm i.e., such that all requirements of the trade can be met.

Another alternative variant embodiment of the inventive portioning apparatus is laid out in such a manner that the upper plate 8 and the lower plate 4 as well as the cutting sleeve 13, i.e., all elements entering into direct contact with the dough, are made from a stainless steel which is admitted for contact with foodstuffs. The remaining parts of the machine can be made from other metals or possibly from sufficiently resistant synthetic plastic materials.

The portioning apparatus now functions, according to a preferred operating method, in the following manner, illustrated in its operating phases in the FIGS. 1 through 4.

In the first operating phase, shown in the FIG. 1, a dough ball 25 is placed onto the lower circular plate 4 arranged horizontally. The volume of the dough ball 25 necessarily must be greater than the one of the finished dough disk 26. It is up to the operator, who easily learns this with a little experience, to form initial balls of a somewhat greater volume, but not excessively voluminous, in such a manner that not too much dough rests must be cut off.

Figure 2:
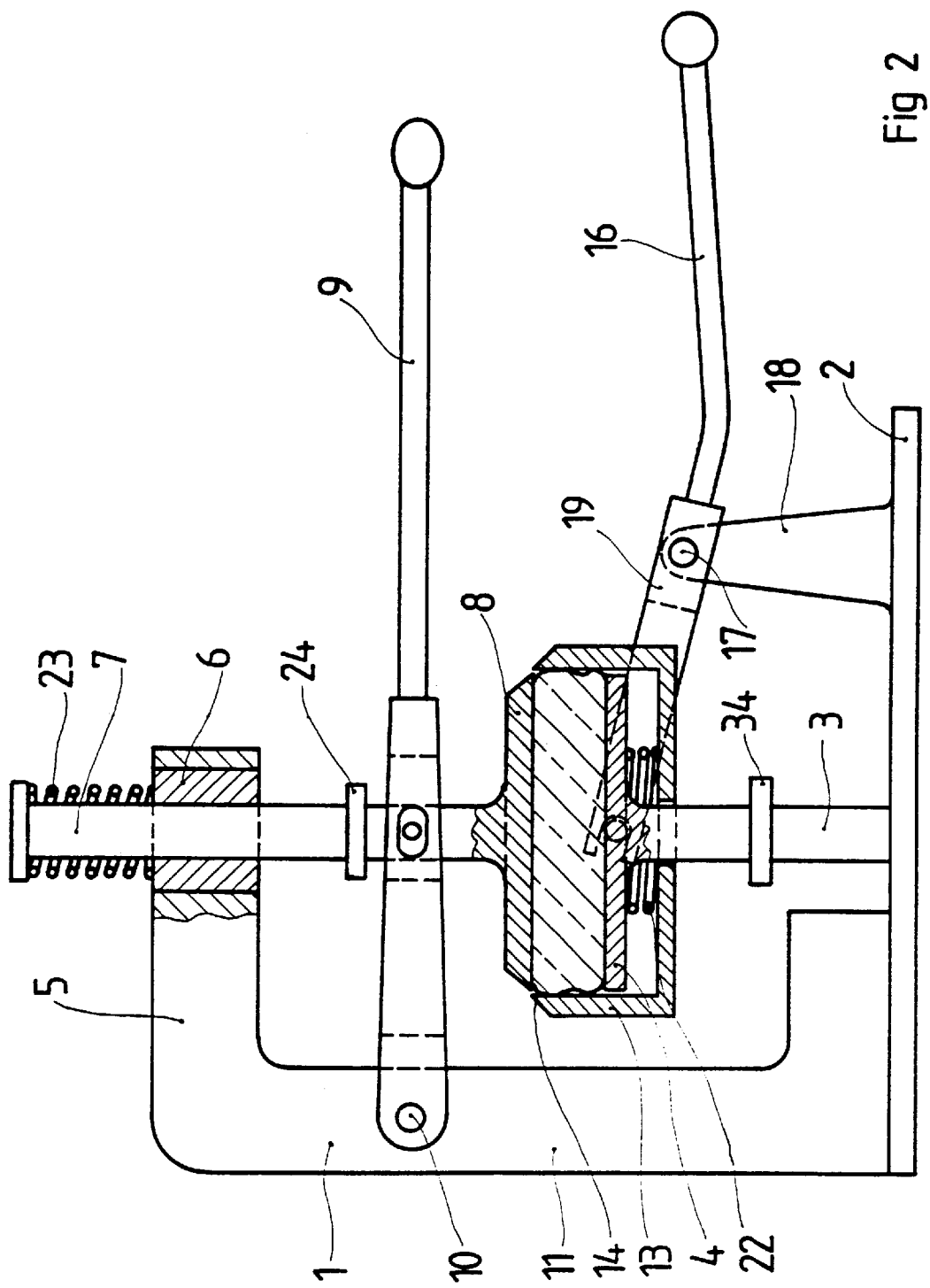
FIGS. 2 through 4 the portioning apparatus according to the FIG. 1, shown in three further consecutive phases of operation.

In a second operating phase, shown in the FIG. 2, the cutting sleeve 13 is lifted to its uppermost position (determined e.g. by the complete compression of the spring 22), and the upper plate 8 is lowered until the dough ball is completely pressed into a chamber enclosed on all sides by the lower plate 4, the upper plate 8 and by the cylindrical lateral wall of the cutting sleeve 13. Evidently, as the volume of the initial dough ball 25 exceeds the one of the finished dough disk 26 to be formed, the upper plate 8 under these conditions can not be lowered further than to a height position above the height h, or the thickness of the finished dough disk 26 respectively (FIGS. 3 and 4).

Figure 3:
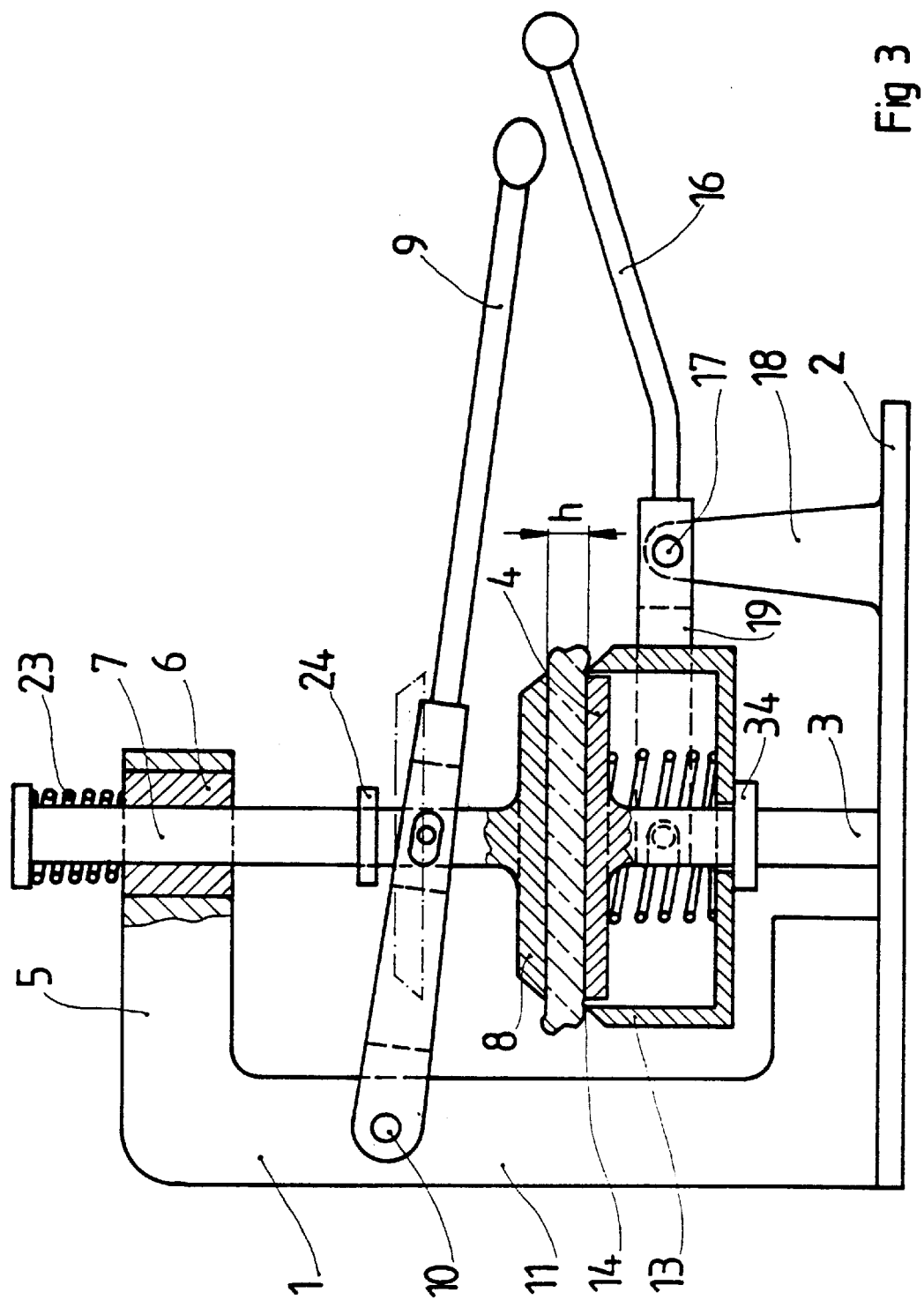

In the next operating phase of the inventive method, shown in the FIG. 3, first the cutting sleeve 13 is lowered to its rest position, i.e., the initial position shown in the FIG. 1, in which the sleeve 13 rests against the stop 34. Thus the thick disk of to dough is set free laterally. Subsequently the upper plate 8 is lowered further until it reaches its lowest position resting against its stop which determines the final distance between the plates 4 and 8 and thus the thickness of the finished dough disk 26 to be produced.

During this last lowering of the upper plate 8 the dough disk is enlarged and exceeds the rims of the plates 4 and 8. The dough quantity emerging from these rims represents is excessive and thus represents the volume contained in the dough ball 25 which exceeds the desired volume of the finished dough disk 26 to be produced.

In a fourth and last operating phase, shown in the FIG. 4, the sleeve 13 of the cutting element 12 is lifted to its highest position in such a manner that it cuts off the excessive ring of dough 27 emerging from between the interspace between the two plates 4 and 8. Thereafter the cutting sleeve 13 is lowered, the upper plate 8 is lifted and the finished dough disk 26 is taken off and the ring of excessive dough 27 is eliminated.

The whole operation is completed within just a few seconds, and thus a nimble operator can produce several hundred dough disks 26 per hour. Such dough disks of calibrated volume, and thus indirectly of calibrated weight, are ideally suited for supplying a pizza spreader machine which applies centrifugal forces.

The solutions shown in the FIGS. 1 through 4 and 5 indicate just two of the many possible variant embodiments within the scope of the present invention. Evidently other solutions similar to the ones shown are possible as far as the function is concerned, in particular solutions in which the lower plate is moved upward while the upper plate is arranged fixedly with respect to the surrounding room, or in which the support and guide pins of the two plates are arranged horizontally instead of vertically.

The present invention is characterized by the simplicity of its design and of its function and by the high production rate that can be achieved without application of any motorized elements.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF THE ELEMENTS IN THE FIGURES

1. Support member
2. Base plate
3. Vertical supporting pin
4. Lower plate
5. Horizontal upper arm of the yoke
6. Slide bearing
7. Guide pin
8. Upper plate
9. Operating lever
10. Pivoting pin
11. Support element
12. Cutting element
13. Sleeve
14. Cutting edge
15. Device for moving
16. Lever
17. Pivoting pin
18. Support member
19. Fork
20. Small fork
21. Pin
22. Force accumulator
23. Force accumulator
24. Vertical stop
25. Dough ball
26. Finished dough disk
27. Ring of excessive dough
28. Pin
29. Slot
30. Slot
31. Slot
32. Slot
33. Slot
34. Slot
35. Holder
36. Graded scale
37. Adjusting screw

What is claim is:

1. An apparatus for manually portioning pizza dough disks having a calibrated volume and suitable for mechanical final spreading, said apparatus comprising:

a support member fastened to a base plate;

a circular lower plate arranged in a substantially horizontal configuration onto which pizza dough is to be placed;

a circular upper plate arranged in a substantially horizontal configuration coaxial with said circular lower plate and having a diameter substantially equal to a diameter of said circular lower plate;

a device for moving said circular lower and upper plate towards each other to a predetermined final distance which corresponds to a desired thickness of a dough disk;

a cutting element having a sleeve with a cutting edge arranged for removal of excessive dough emerging radially from an annular space between said circular lower and upper plates; and a moving mechanism for axially moving said sleeve relative to said circular lower and upper plate, wherein the cutting edge cuts excessive dough emerging radially from the annular space between said circular lower and upper plate.

2. The apparatus according to claim 1, wherein said circular lower plate is in a fixed position, and said circular upper plate is movable relative to said circular lower plate from an initial open upper position to a lowest position in which said apparatus is closed and wherein the distance between said circular lower and upper plate corresponds to the predetermined final distance.

3. The apparatus according to claim 1, wherein said circular upper plate is fastened to a guide pin arranged coaxially with said upper circular plate and in which said guide pin slides in a vertical bearing attached to an upper arm of said support member.

4. The apparatus according to claim 3, wherein a spring is concentrically located on said guide pin which forces said circular upper plate upward against a vertical stop.

5. The apparatus according to claim 1, wherein said sleeve is arranged below said circular lower plate and can be moved in an axial direction upwardly in such a manner that it moves from a rest position in which its cutting edge is located in one of in a plane below and at the same level as an upper surface of said lower plate, to a cutting position in which said cutting edge is located above a lower surface of said circular upper plate in its lowermost position, which determines the predetermined final distance.

6. The apparatus according to claim 1, wherein vertical movement of said circular upper plate and of said cutting element is effected using an operating lever for each, said operating lever having a handle that pivots at a pivoting point in such a manner that a manual force applied to said handle of said operating lever is increased by a gained leverage.

7. The apparatus according to claim 6, wherein said pivoting points of said operating levers are configured as open slots in such a manner that said operating levers can be mounted and dismantled without the use of tools, thereby facilitating the transportation and shipping of said apparatus.

8. The apparatus according to claim 6, wherein said pivoting point of said operating lever for moving said circular upper plate is fastened to a holder which is adjustably fastened in a vertical direction to a vertical portion of said support member, so as to facilitate setting the predetermined final distance between said circular lower and upper plate.

9. The apparatus according to claim 1, wherein said moving mechanism comprises a spring which forces said sleeve against a vertical stop which holds said sleeve outside of the annular space between said circular lower and upper plate in all their respective range of vertical positions.

10. The apparatus according to claim 1, wherein the diameter of said circular lower and upper plate ranges between 100 and 200 mm.

11. The apparatus according to claim 1, wherein the predetermined final distance between said circular lower and upper plate ranges between 8 and 20 mm.

12. The apparatus according to claim 1, wherein at least said circular lower and upper plate and said sleeve are made from stainless steel approved for handling food products.

13. The apparatus according to claim 1, wherein said support member is in the shape of a yoke.

14. The apparatus according to claim 1, wherein said sleeve of said cutting element surrounds one of said circular lower and upper plate and is arranged so that the other of said circular lower and upper plate fits within an annular region formed by said sleeve.

15. A method of operating an apparatus for manually portioning pizza dough disks having a calibrated volume and suitable for mechanical final spreading, the apparatus including a support member fastened to a base plate, a circular lower plate arranged in a substantially horizontal configuration onto which a dough portion is to be placed, a circular upper plate arranged in a substantially horizontal configuration and coaxial with the circular lower plate and having a diameter substantially equal to a diameter of the circular lower plate, a device for moving the circular lower and upper plate towards each other to a predetermined final distance which corresponds to a desired thickness of the dough disk, a cutting element having a sleeve with a cutting edge arranged for removal of excessive dough emerging radially from an annular space between the circular lower and upper plates, and a moving mechanism for axially moving the sleeve relative to the circular lower and upper plates, the method comprising:

placing a ball of pizza dough of a volume greater than a desired final volume onto the circular lower plate;

moving the circular upper plate and the circular lower plate toward each other until the dough ball is pressed into the annular space between the circular lower plate and upper plate; and moving the sleeve of the cutting element to cut off a ring of excessive dough which emerges radially from the annular space between the two plates.

16. The process according to claim 15, further comprising lowering the sleeve of the cutting element until it rests against a lower stop, lifting the upper plate, taking off the finished dough disk and eliminating the ring of excessive dough.

17. The process according to claim 15, further comprising moving the sleeve of the cutting element to a lowest rest position and, after the cutting element has been lowered, further lowering the upper plate until it rests against a stop which position determines the predetermined final distance; and lifting the sleeve of the cutting element to an uppermost position in such a manner that it cuts off the ring of excessive dough which emerges radially from the annular space between the two plates.

18. The process according to claim 15, wherein the mechanical final spreading is provided by centrifugal force.

* * * * *